(12) United States Patent
Brunet et al.

(10) Patent No.: US 7,937,951 B2
(45) Date of Patent: May 10, 2011

(54) SYSTEM FOR COOLING THE IMPELLER OF A CENTRIFUGAL COMPRESSOR

(75) Inventors: Antoine Robert Alain Brunet, Moissy Cramayel (FR); Jean-Christophe Leininger, Paris (FR); David Locatelli, Gex (FR); Romain Nicolas Lunel, Brie Comte Robert (FR)

(73) Assignee: SNECMA, Paris (FR)

( * ) Notice: Subject to any disclaimer, the term of this patent is extended or adjusted under 35 U.S.C. 154(b) by 963 days.

(21) Appl. No.: 11/780,225

(22) Filed: Jul. 19, 2007

(65) Prior Publication Data
US 2008/0141678 A1 Jun. 19, 2008

(30) Foreign Application Priority Data
Jul. 19, 2006 (FR) .................................... 06 06539

(51) Int. Cl.
*F02C 7/12* (2006.01)
(52) U.S. Cl. .......................................... 60/806; 60/726
(58) Field of Classification Search .................. 60/726, 60/751, 782, 785, 806; 416/95, 96 R; 415/115, 415/144, 145
See application file for complete search history.

(56) References Cited

U.S. PATENT DOCUMENTS

| | | | | |
|---|---|---|---|---|
| 3,088,279 A * | 5/1963 | Diedrich | ......................... | 60/804 |
| 4,462,204 A * | 7/1984 | Hull | ................................ | 60/806 |
| 4,761,947 A * | 8/1988 | Hennecke et al. | ............. | 60/806 |
| 5,555,721 A * | 9/1996 | Bourneuf et al. | ............... | 60/806 |
| 5,601,406 A * | 2/1997 | Chan et al. | .................... | 415/206 |
| 6,276,896 B1 * | 8/2001 | Burge et al. | ................... | 415/115 |
| 6,843,059 B2 * | 1/2005 | Burrus et al. | .................. | 60/751 |
| 2001/0047651 A1 | 12/2001 | Fukutani | | |
| 2006/0123795 A1 * | 6/2006 | Fish et al. | ....................... | 60/772 |

FOREIGN PATENT DOCUMENTS

| DE | 198 45 375 A1 | 4/2000 |
|---|---|---|
| EP | 0 961 033 A1 | 12/1999 |

OTHER PUBLICATIONS

U.S. Appl. No. 11/778,928, filed Jul. 17, 2007, Argaud, et al.
U.S. Appl. No. 11/779,000, filed Jul. 17, 2007, Argaud, et al.
U.S. Appl. No. 11/779,016, filed Jul. 17, 2007, Argaud, et al.
U.S. Appl. No. 11/780,287, filed Jul. 19, 2007, Brunet, et al.
U.S. Appl. No. 11/780,223, filed Jul. 19, 2007, Brunet, et al.

* cited by examiner

*Primary Examiner* — Michael Cuff
*Assistant Examiner* — Phutthiwat Wongwian
(74) *Attorney, Agent, or Firm* — Oblon, Spivak, McClelland, Maier & Neustadt, L.L.P.

(57) ABSTRACT

A system for cooling the impeller of a centrifugal compressor in a turbomachine is disclosed. The compressor supplies an annular diffuser. The diffuser includes an end-piece that extends downstream and along the impeller of the compressor and is covered on the upstream side by an annular metal sheet. The sheet delimits, with the impeller of the compressor, a first annular passageway to carry away the air taken from the outlet of the compressor and, with the end-piece of the diffuser, a second annular passageway to carry away a portion of the air flow coming out of the diffuser.

11 Claims, 2 Drawing Sheets

SYSTEM FOR COOLING THE IMPELLER OF A CENTRIFUGAL COMPRESSOR

The present invention relates to a system for cooling the impeller of a centrifugal compressor, in particular in a turbomachine such as an aircraft turbojet or turboprop.

BACKGROUND OF THE INVENTION

In a known manner, the centrifugal compressor of a turbomachine is associated with an annular diffuser of bent shape whose inlet is radially aligned with the outlet of the compressor and whose outlet is oriented downstream and situated radially outside an annular combustion chamber mounted in an annular space delimited by an external casing.

DESCRIPTION OF THE PRIOR ART

The diffuser comprises an annular end-piece that extends downstream and along the rotor, also called the impeller, of the compressor and that is connected downstream to structural components supporting the combustion chamber, particularly to means for the injection of air for cooling and/or ventilating a turbine situated downstream of the combustion chamber. The end-piece of the diffuser delimits, with the impeller of the compressor, a radial annular passageway to carry away the air taken from the outlet of the compressor (see for example documents U.S. Pat. No. 5,555,721 and DE-A-19845375).

This air is subjected to a considerable viscous shearing between the impeller and the end-piece of the diffuser, which generates a considerable quantity of heat absorbed largely by the impeller of the compressor and results in a considerable increase in the temperature of the impeller and a risk of damage to the impeller and of reducing its service life.

A solution to this problem consists in attaching an annular heat protection shield to the impeller of the compressor, this shield delimiting, with the impeller, an annular air cavity intended to protect the impeller from the heat of the air taken from the outlet of the compressor. However, this solution is not satisfactory because the shield is heavy and increases the weight of the turbomachine and the inertia of the impeller of the compressor.

SUMMARY OF THE INVENTION

The object of the invention is in particular to provide a simple, effective and economic solution to these problems of the prior art.

Accordingly, it proposes a system for cooling the impeller of a centrifugal compressor, in particular in a turbomachine, this compressor supplying an annular diffuser supported by an external casing and comprising an annular end-piece that extends downstream and along the impeller of the centrifugal compressor and that is connected downstream to structural components for supporting the combustion chamber of the turbomachine, wherein the end-piece of the diffuser is covered on the upstream side by an annular metal sheet that is attached to this end-piece and that delimits, with the impeller of the compressor, a first annular passageway to carry away the air taken from the outlet of the compressor and, with the end-piece of the diffuser, a second annular passageway to carry away a portion of the air flow coming out of the diffuser.

The heat generated by the shearing of the air that flows in the first annular passageway is absorbed largely by convection by the air coming out of the diffuser and flowing into the second annular passageway delimited by the annular metal sheet and the end-piece of the diffuser. The invention therefore makes it possible to limit the quantity of heat absorbed by the impeller of the final stage of the compressor and thereby to increase its service life.

In a preferred embodiment of the invention, radial fins extend between the annular metal sheet and the end-piece of the diffuser and are evenly distributed about the axis of the turbomachine. These fins stiffen the end-piece of the diffuser that can therefore transmit forces without deforming.

The fins advantageously comprise upstream fins extending between the radial portions of the annular metal sheet and of the end-piece of the diffuser and downstream fins extending between the cylindrical portions of the annular metal sheet and of the end-piece of the diffuser. The upstream fins may be approximately 36 in number, similar to the downstream fins.

These fins are advantageously formed in a single piece with the end-piece of the diffuser and are attached to the annular metal sheet, for example by welding or brazing. The ends of the fins fixedly attached to the end-piece may be engaged and held in slots or grooves of corresponding shape of the annular metal sheet.

The annular metal sheet is situated upstream and inside the end-piece of the diffuser, relative to the direction of flow of the air in the second annular passageway, and is attached by welding to the end-piece of the diffuser. Typically, the annular metal sheet has a thickness lying between 0.8 and 1.5 mm approximately.

The end-piece of the diffuser advantageously comprises, at its upstream end, an annular array of inlet orifices for the air originating from the diffuser, these orifices being oriented substantially radially and opening at their radially internal ends into the second annular passageway. This end-piece may be attached or centered at its downstream end to the means for injecting turbine-cooling air, the outlet of the second annular passageway communicating with the inlet of these injection means.

The invention also relates to a turbomachine, such as an aircraft turbojet or turboprop, which comprises a system for cooling the impeller of a centrifugal compressor as described above.

BRIEF DESCRIPTION OF THE DRAWINGS

The invention will be better understood and other details, features and advantages of the present invention will appear on reading the following description made as a nonlimiting example and with reference to the appended drawings, in which.

DESCRIPTION OF THE PREFERRED EMBODIMENTS

Figure 1:
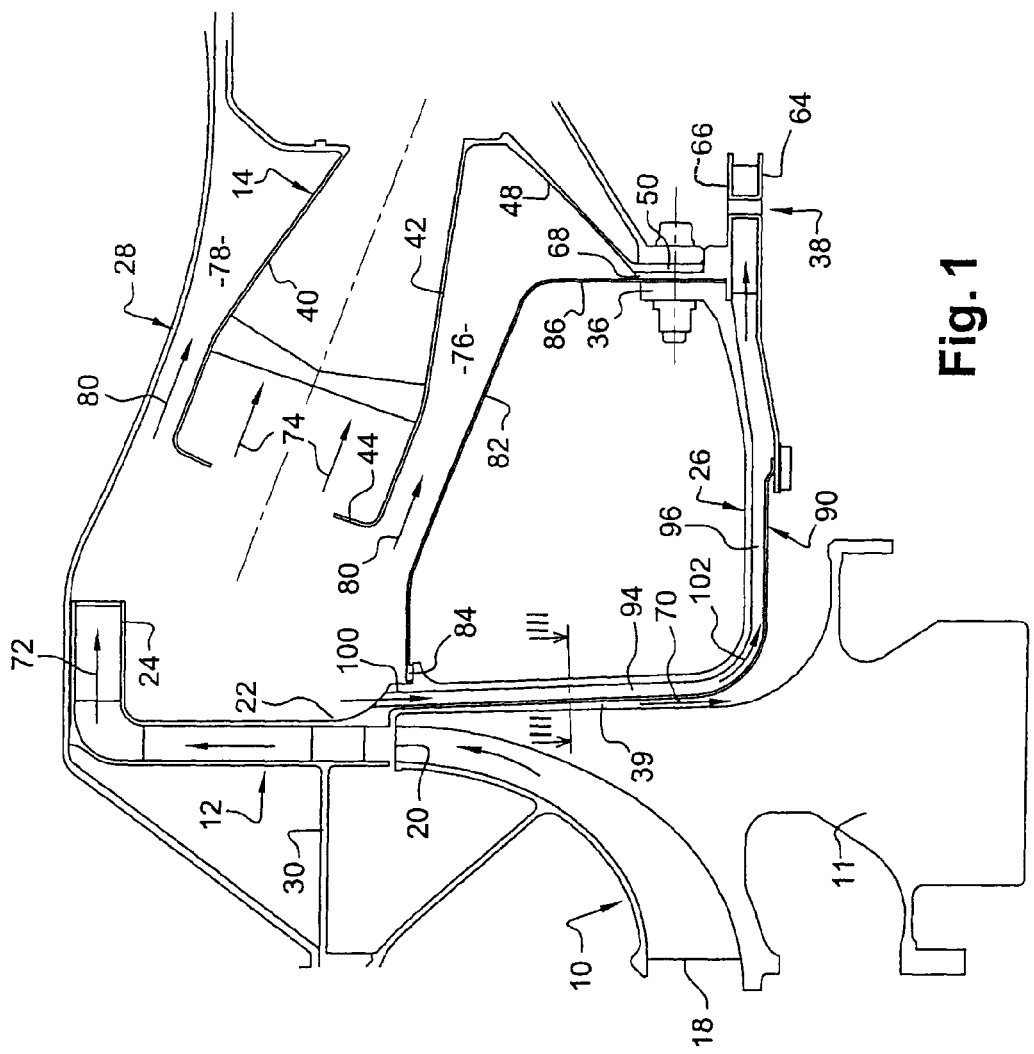
FIG. 1 is a partial schematic half-view in axial section of a system for cooling the impeller of a centrifugal compressor according to the invention.

Reference is made first of all to FIG. 1 which represents a portion of a turbomachine, such as an aircraft turbojet or turboprop, comprising from upstream to downstream, in the direction of flow of the gases inside the turbomachine, a compressor centrifugal stage 10, a diffuser 12 and a combustion chamber 14.

The inlet 18 of the centrifugal stage 10 is oriented upstream, substantially parallel to the axis of the turbomachine, and its outlet 20 is oriented outward, substantially perpendicularly to the axis of the turbomachine, and is aligned with a radial inlet 22 of the diffuser 12. The diffuser is of annular shape bent at 90° and comprises an annular outlet 24 that is oriented parallel to the axis of the turbomachine and that opens at its downstream end radially at the outside of the inlet of the combustion chamber 14.

The diffuser 12 is supported by an external casing 28 of the turbomachine that externally surrounds the compressor 10, the diffuser 12 and the combustion chamber 14. The diffuser 12 comprises a substantially cylindrical upstream ring 30 attached by appropriate means of the screw-nut type to the external casing 28.

The diffuser 12 also comprises an end-piece 26 with a substantially L-shaped section having an upstream portion that extends substantially radially inward from the inlet 22 of the diffuser 12 and that is connected at its radially internal end to a substantially cylindrical portion of the end-piece. This cylindrical portion of the end-piece 26 comprises, at its downstream end, an annular flange 36 for attaching to means 38 for injecting turbine-cooling air. The radial portion of the end-piece 26 extends downstream of the rotor or impeller 11 of the centrifugal stage of the compressor, along and a short distance from the rotor or impeller 11 of the centrifugal stage of the compressor in order to form a radial annular passageway 39 communicating at its radially external end with the outlet 20 of the compressor.

The combustion chamber 14 comprises two coaxial walls of revolution 40, 42 extending one inside the other and connected at their upstream ends to a chamber-bottom wall 44, these walls 40, 42 and 44 delimiting between them an annular enclosure into which fuel is brought by injectors (not shown). The radially external wall 40 of the chamber is attached at its downstream end to the external casing 28 and the radially internal wall 42 of the chamber is connected at its downstream end to a frustoconical ring 48 that comprises at its radially internal end an internal annular flange 50 for attachment to the aforementioned injection means 38.

The means 38 for injecting cooling air comprise two cylindrical walls, an internal cylindrical wall 64 and external cylindrical wall 66, that are mounted one inside the other and define between them an annular stream that opens radially upstream inside the end-piece 26 and radially downstream inside the ring 48 of the chamber 14. The external wall 66 comprises an external annular rim 68 to which the flanges 36 and 50 are applied, and which comprises orifices of attachment means of the screw-nut type to pass through which extend parallel to the axis of the turbomachine through corresponding orifices of the flanges 36, 50.

A small portion of the air flow coming out of the centrifugal compressor 10 is taken by the radial passageway 39 defined by the impeller 11 of the compressor and the end-piece 26. This air (arrow 70) is subjected at the output of the compressor to a considerable viscous shearing caused by the rotation of the impeller 11 close to the radial portion of the end-piece, which generates heat and causes a heating of the impeller which has a limited heat resistance (for example 500° C. for a titanium impeller).

The air coming out of the diffuser 12 (arrow 72) supplies partly the combustion chamber 14 (arrows 74), and partly an internal annular stream 76 and external annular stream 78 going round the combustion chamber 14 (arrows 80).

The external stream 78 is formed between the external casing 28 and the external wall 40 of the chamber, and the air that passes into this stream is used for cooling and/or ventilating components, not shown, situated downstream of this chamber.

The internal stream 76 is formed between the internal wall 42 of the chamber and an annular convecting metal sheet 82 that is mounted radially between the combustion chamber 14 and the end-piece 26, and the air that passes into this stream supplies holes in the chamber 14. The metal sheet 82 comprises, at its upstream end, a cylindrical rim 84 that is mounted on a corresponding cylindrical rim provided at the radially external end of the end-piece 26, and, at its downstream end, an internal annular flange 86 that is clamped axially between the flange 36 of the end-piece and the annular rim 68 of the injection means 38.

According to the invention, an annular metal sheet is inserted axially between the impeller 11 of the compressor and the end-piece 26 of the diffuser in order to form, with the impeller 11, the aforementioned radial passageway 39 and, with the end-piece 26, a second annular passageway to carry away a portion of the air flow coming out of the diffuser 12 in order to ventilate the annular metal sheet and absorb the heat generated by the shearing of the air in the first passageway 39.

In the example shown, the annular metal sheet 90 has a substantially L-shaped section and extends coaxially with the end-piece 26 of the diffuser, upstream and inside the latter, in order to delimit an annular passageway 98 bent at a right angle, the metal sheet 90 being fixedly attached to the end-piece 26 by radial fins 94, 96 which extend in the annular passageway 98 between the metal sheet and the end-piece.

The annular metal sheet 90 comprises a radial upstream portion that extends between the impeller 11 of the compressor and the end-piece of the diffuser, substantially parallel and at a short distance from the latter, and that is connected at its radially external end to the diffuser 12, and a substantially cylindrical portion that presses in a radially sealed manner at its downstream end on the upstream end of the internal wall 64 of the air-injection means 38.

Upstream radial fins 94 connect the radial portions of the end-piece 26 and of the metal sheet 90, over a major portion of their radial dimension, and downstream radial fins 96 connect the cylindrical portions opposite the end-piece 26 and the metal sheet 90. These fins 94, 96 make it possible to stiffen the end-piece of the diffuser which transmits forces between the diffuser 12 and the combustion chamber 14. The fins 94 are approximately 36 in number, for example, like the fins 96, and are evenly distributed about the axis of the turbomachine.

The end-piece 26 of the diffuser comprises, at is radially external end, radial orifices 100 evenly distributed about the axis of the turbomachine. These orifices 100 provide a fluid communication between the annular enclosure delimited by the external casing 28 and into which the outlet of the diffuser 12 emerges, and the annular passageway 98 formed between the end-piece 26 and the annular metal sheet 90. The flow of the air to supply the passageway 98 is defined by the total section of the orifices 100, this air flowing in the passageway 98 and then entering the injection means 38 (arrow 102).

Figure 3:
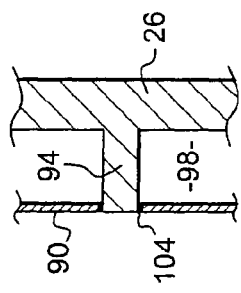
FIG. 3 is a partial view, on a larger scale, in section along the line III-III of FIG. 1.
Figure 2:
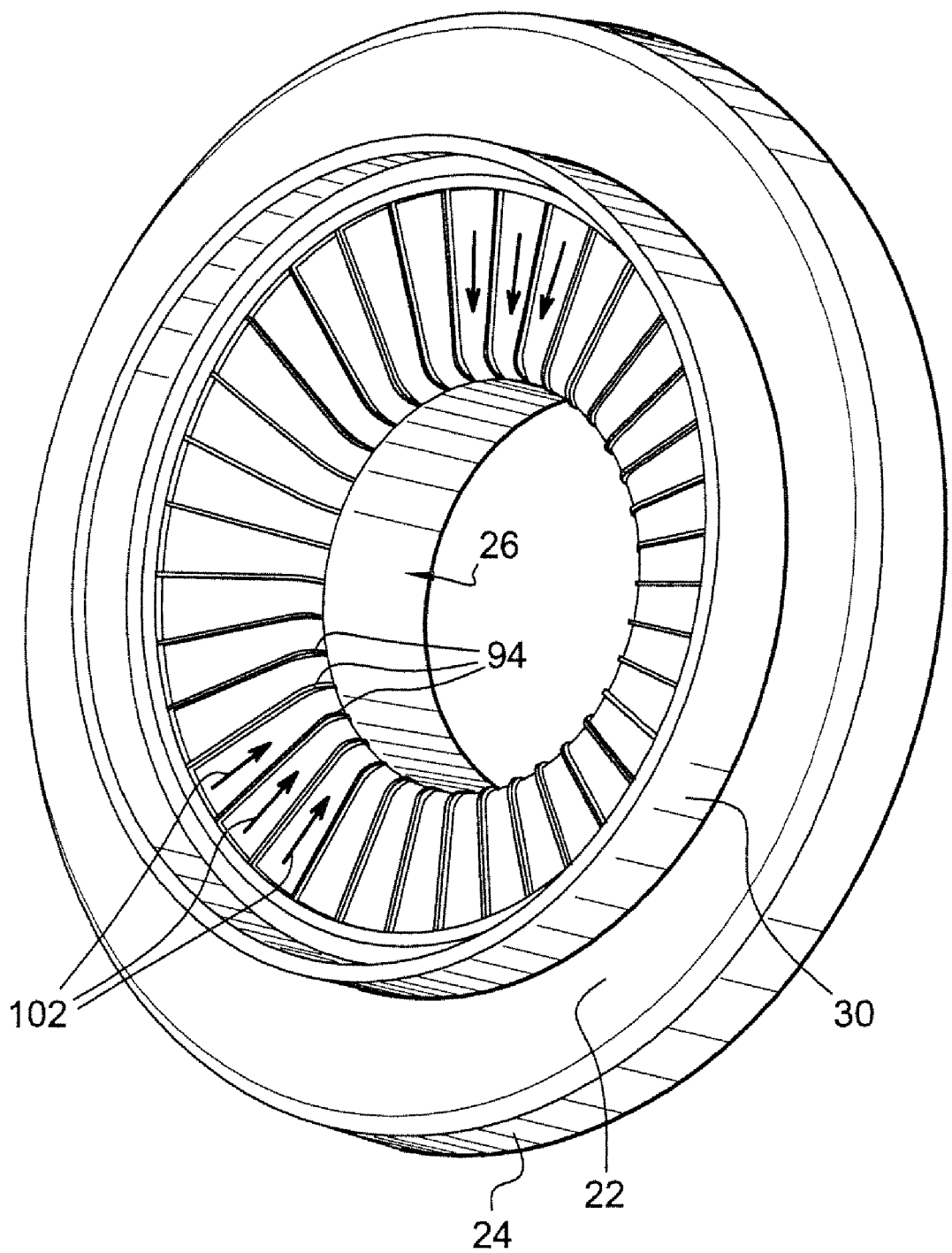
FIG. 2 is a schematic view in perspective of the diffuser of the system according to the invention, seen from downstream.

The end-piece 26 of the diffuser is, as shown in FIGS. 1 to 3, formed in a single piece with the diffuser 12 and with the fins 94, 96 and the annular metal sheet 90 is fitted and attached to the fins and the end-piece 26. The radially external end of the metal sheet 90 is attached by welding to the radially external end of the end-piece 26, upstream of the air inlet orifices 100. The free ends of the fins 94, 96 opposite to the end-piece 26 may be engaged and held, for example by welding or brazing, in radial grooves or slots 104 of corresponding shape formed on the annular metal sheet 90 (FIG. 3).

Typically, the annular metal sheet 90 has a thickness lying between 0.8 and 1.5 mm approximately, less than that of the end-piece 26 of the diffuser.

As a variant, the fins 94, 96 could be made separately from the end-piece 26 and the metal sheet 90 and attached by appropriate means at their ends to the end-piece 26 and the metal sheet 90 respectively.

The invention claimed is:

1. A system for cooling the impeller of a centrifugal compressor, comprising:
   the centrifugal compressor including an impeller;
   an annular diffuser supported by an external casing and including an L-shaped annular end-piece that extends downstream and along the impeller of the centrifugal compressor and that is connected downstream to supporting structural components which support a combustion chamber of the turbomachine, the annular end-piece of the diffuser including an upstream portion that extends radially inward from an inlet of the diffuser and a cylindrical portion which is connected to a radially internal end of the upstream portion; and
   an L-shaped annular metal sheet provided between the annular end-piece of the diffuser and the impeller of the centrifugal compressor and being attached to the annular end-piece of the diffuser, the metal sheet including a radial upstream portion radially extending between the impeller of the centrifugal compressor and the annular end-piece of the diffuser and a cylindrical portion axially extending from a radially internal end of the radial upstream portion of the metal sheet,
   wherein the metal sheet cooperates with the impeller of the centrifugal compressor to provide a first annular passageway to carry away the air taken from the outlet of the compressor and cooperates with the annular end-piece of the diffuser to provide a second annular passageway to carry away a portion of the air flow coming out of the diffuser,
   wherein upstream fins are provided between the upstream portion of the annular end-piece of the diffuser and the radial upstream portion of the metal sheet, and
   wherein downstream fins are provided between the cylindrical portion of the annular end-piece of the diffuser and the cylindrical portion of the metal sheet.

2. The system as claimed in claim 1, wherein the fins are evenly distributed about an axis of the turbomachine.

3. The system as claimed in claim 1, wherein the upstream and downstream fins are each approximately 36 in number.

4. The system as claimed in claim 1, wherein the fins are formed in a single piece with the end-piece of the annular diffuser and the fins are attached by welding or brazing to the annular metal sheet.

5. The system as claimed in claim 4, wherein ends of the fins fixedly attached to the end-piece of the diffuser are engaged in slots or grooves of the annular metal sheet.

6. The system as claimed in claim 1, wherein the annular metal sheet is attached by welding to the end-piece of the diffuser.

7. The system as claimed in claim 1, wherein an upstream end of the end-piece of the diffuser includes an annular array of inlet orifices for the air originating from the diffuser, the orifices are oriented substantially radially and open at their radially internal ends into the second annular passageway.

8. The system as claimed in claim 1, wherein a downstream end of the end-piece of the diffuser is attached to an injecting unit which injects turbine-cooling air, and the outlet of the second annular passageway communicating with the inlet of the injecting unit.

9. A turbomachine, which comprises a cooling system as claimed in claim 1.

10. The system as claimed in claim 8, wherein the injecting unit includes an external cylindrical wall and an internal cylindrical wall which define therebetween an annular stream.

11. The system as claimed in claim 10, wherein the external cylindrical wall includes an external rim which attaches to a flange of a the combustion chamber and a flange of the annular end-piece of the diffuser.

\* \* \* \* \*

UNITED STATES PATENT AND TRADEMARK OFFICE
CERTIFICATE OF CORRECTION

| | | |
|---|---|---|
| PATENT NO. | : 7,937,951 B2 | Page 1 of 1 |
| APPLICATION NO. | : 11/780225 | |
| DATED | : May 10, 2011 | |
| INVENTOR(S) | : Antoine Robert Alain Brunet et al. | |

It is certified that error appears in the above-identified patent and that said Letters Patent is hereby corrected as shown below:

Column 6, line 36, before "the combustion chamber" delete --a--.

Signed and Sealed this
Nineteenth Day of July, 2011

David J. Kappos
*Director of the United States Patent and Trademark Office*